US012131876B2

(12) United States Patent
Tsai

(10) Patent No.: US 12,131,876 B2
(45) Date of Patent: Oct. 29, 2024

(54) MEMBRANE SWITCH

(71) Applicant: Primax Electronics Ltd., Taipei (TW)

(72) Inventor: Lei-Lung Tsai, Taipei (TW)

(73) Assignee: Primax Electronics Ltd., Taipei (TW)

( * ) Notice: Subject to any disclaimer, the term of this patent is extended or adjusted under 35 U.S.C. 154(b) by 105 days.

(21) Appl. No.: 18/105,711

(22) Filed: Feb. 3, 2023

(65) Prior Publication Data

US 2024/0170236 A1 May 23, 2024

(30) Foreign Application Priority Data

Nov. 17, 2022 (TW) ................................ 111144021

(51) Int. Cl.
*H01H 13/703* (2006.01)
*H01H 13/7073* (2006.01)

(52) U.S. Cl.
CPC ...... *H01H 13/703* (2013.01); *H01H 13/7073* (2013.01); *H01H 2233/07* (2013.01)

(58) Field of Classification Search
CPC .. H01H 13/70; H01H 13/702; H01H 13/7006; H01H 13/703; H01H 13/704; H01H 13/77073; H01H 2233/07; H01H 13/7073; H01H 3/12; H01H 13/14; H01H 13/50; H01H 13/52; H01H 2003/12; H01H 2013/00; H01H 2013/02; H01H 2013/50; H01H 2013/52; H01H 2231/002
USPC ........................................................... 200/512
See application file for complete search history.

(56) References Cited

U.S. PATENT DOCUMENTS 8,368,505 B2 * 2/2013 Deppiesse ............ H03K 17/965 338/114
2008/0135392 A1 * 6/2008 Huang .................. H01H 13/83 200/310
2010/0282585 A1 * 11/2010 Jonas .................. H01H 13/703 200/514

* cited by examiner

*Primary Examiner* — Anthony R Jimenez
(74) *Attorney, Agent, or Firm* — KIRTON McCONKIE; Evan R. Witt

(57) ABSTRACT

A membrane switch includes a first conductive pattern, a second conductive pattern and a processor. The first circuit layer is aligned with the second conductive pattern. The first conductive pattern and the second conductive pattern have different shapes. When the second conductive pattern is contacted with and covered by the first conductive pattern, a conductive contact surface is formed. The conductive contact surface has a resistance value corresponding to an area of the conductive contact surface. A processor judges whether a key signal is generated according to the resistance value.

13 Claims, 7 Drawing Sheets

MEMBRANE SWITCH

FIELD OF THE INVENTION

The present invention relates to a keyboard device, and more particularly to a membrane switch for a keyboard device.

BACKGROUND OF THE INVENTION

As known, a keyboard circuit of a keyboard device mainly comprises plural membrane switches and a processor. Generally, the processor of the keyboard device determines whether a specified membrane switch is pressed and triggered by the user according to the result of judging whether an electric signal is transmitted through the membrane switch. Normally, in case that the membrane switch is turned off, the electric signal cannot be transmitted through the membrane switch. Since no electric signal transmitted through the membrane switch is detected, the processor determines that the membrane switch has not been pressed and triggered. Under this circumstance, the key signal is not generated.

However, since plural membrane switches are densely arranged on the same keyboard circuit, some drawbacks occur. For example, the signal lines connected with a specified membrane switch are possibly interfered by the signal lines that are connected with the adjacent membrane switches. When the adjacent membrane switches are pressed and triggered, a small amount of interference electric signal is possibly transmitted through the specified membrane switch even if the specified membrane switch is not pressed and triggered. Due to the interference electric signal, the processor may misjudge that the membrane switch is triggered. Consequently, even if the membrane switch is not pressed, the processor generates the corresponding key signal. This is also called as a ghost key phenomenon.

For avoiding the ghost key phenomenon, the keyboard device is further equipped with plural diodes. Each diode is located near the corresponding membrane switch. Since the current is allowed to flow in one direction through the arrangement of the diodes, the above-mentioned ghost key phenomenon can be avoided. However, the arrangement of the diodes near the corresponding membrane switches still has some drawbacks. For example, since the diode is not cost-effective, the cost of the keyboard device is increased. In addition, the assembling difficulty is increased.

SUMMARY OF THE INVENTION

For solving the drawbacks of the conventional technologies, the present invention provides a membrane switch for a keyboard device. The structure of the membrane switch is specially designed. When the membrane switch is pressed and triggered, a conductive contact surface in the membrane switch is defined. The conductive contact surface is related to a resistance value. According to the resistance value, a processor of the keyboard device judges whether the membrane switch is indeed pressed.

In accordance with an aspect of the present invention, a membrane switch is provided. The membrane switch includes a first circuit layer, a second circuit layer and a spacer layer. The first circuit layer includes a first conductive pattern. The second circuit layer includes a second conductive pattern. The second circuit layer is aligned with the first circuit layer. The second conductive pattern is aligned with the first conductive pattern. The second conductive pattern and the first conductive pattern have different shapes. The spacer layer is arranged between the first circuit layer and the second circuit layer. The spacer layer includes a perforation. The perforation is aligned with the first conductive pattern and the second conductive pattern. After the first conductive pattern is penetrated through the perforation and the first conductive pattern is contacted with the second conductive pattern, a conductive contact surface is formed between the first conductive pattern and the second conductive pattern, and the conductive contact surface has a resistance value corresponding to an area of the conductive contact surface. When a current flows from the first conductive pattern to the second conductive pattern through the conductive contact surface, a key signal is generated according to the resistance value.

In an embodiment, the first circuit layer further includes a first conductor line, and the second circuit layer includes a second conductor line. The first conductor line is electrically connected with the first conductive pattern. The second conductor line is electrically connected with the second conductive pattern.

In an embodiment, the membrane switch is electrically connected with a processor, and the processor judges whether the key signal is generated according to the resistance value.

In an embodiment, the area of the conductive contact surface and the resistance value of the conductive contact surface are negatively correlated with each other.

In an embodiment, when the second conductive pattern is contacted with and covered by the first conductive pattern, the conductive contact surface is formed.

In an embodiment, the second conductive pattern includes a first conduction region, a separation region and a second conduction region. The first conduction region and the second conduction region are aligned with each other. The separation region is arranged between the first conduction region and the second conduction region. The first conduction region and the second conduction region are separated from each other by the separation region.

In an embodiment, the first conduction region, the second conduction region and the separation region are aligned with the first conductive pattern.

In an embodiment, when the first conductive pattern is contacted with the second conductive pattern, the first conduction region, the separation region and the second conduction region of the second conductive pattern are electrically contacted with and covered by the first conductive pattern, and the conductive contact surface is formed. Consequently, the first conduction region and the second conduction region are electrically connected with each other through the conductive contact surface.

In an embodiment, when the area of the conductive contact surface is equal to a first area, the resistance value is equal to a first resistance value. When the area of the conductive contact surface is equal to a second area, the resistance value is equal to a second resistance value.

In an embodiment, the second area is larger than the first area, and the second resistance value is larger than the first resistance value.

In an embodiment, if the resistance value is smaller than or equal to the first resistance value, the key signal is generated.

In an embodiment, if the resistance value is larger than or equal to the second resistance value and the resistance value is smaller than the first resistance value, the key signal is generated.

In an embodiment, when the area of the conductive contact surface is equal to the first area, the resistance value is 5 k ohms. When the area of the conductive contact surface is equal to the second area, the resistance value is 2.5 k ohms.

In accordance with another aspect of the present invention, a key structure with a membrane switch is provided. The key structure includes a base plate, the membrane switch, an elastic triggering element, a keycap and a supporting element. The membrane switch is installed on the base plate. The membrane switch includes a first circuit layer, a second circuit layer and a spacer layer. The first circuit layer includes a first conductive pattern. The second circuit layer includes a second conductive pattern. The spacer layer includes a perforation. The second circuit layer is aligned with the first circuit layer. The spacer layer is arranged between the first circuit layer and the second circuit layer. The second conductive pattern is aligned with the first conductive pattern. The second conductive pattern and the first conductive pattern have different shapes. The perforation is aligned with the first conductive pattern and the second conductive pattern. The elastic triggering element is located over the membrane switch and aligned with the first conductive pattern and the second conductive pattern. The keycap is located over the elastic triggering element. The first conductive pattern and the second conductive pattern are covered by the keycap. The supporting element is connected with the keycap and the base plate.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments and accompanying drawings.

Figure 1:
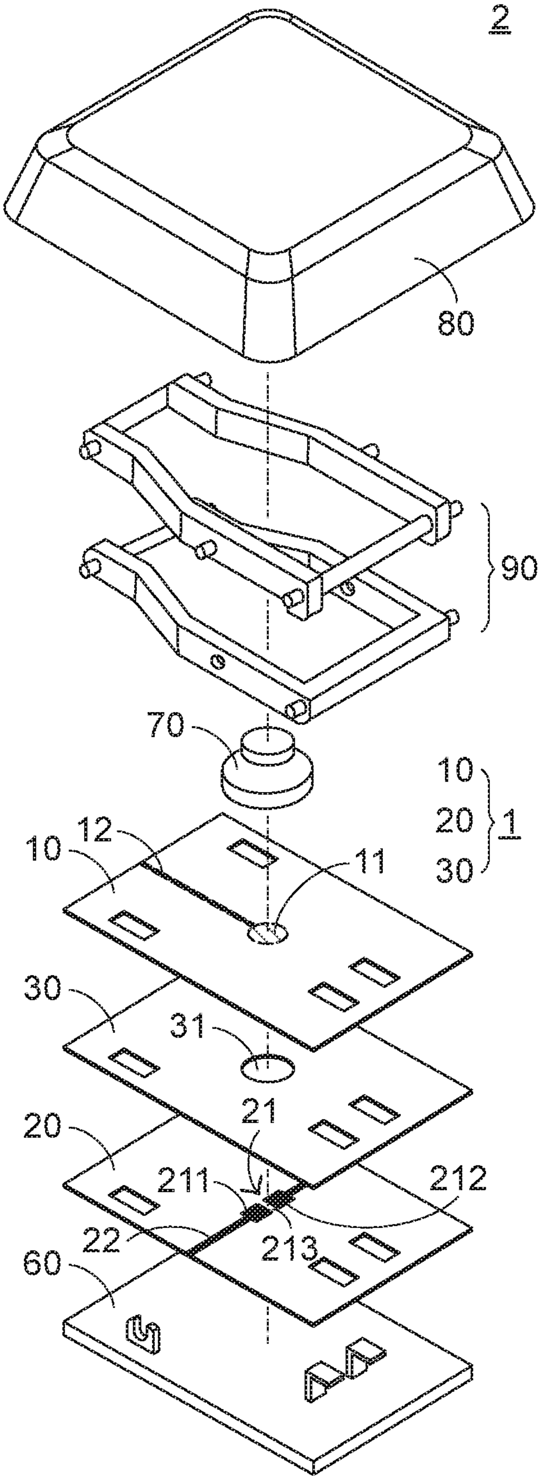
FIG. 1 is a schematic exploded view illustrating a key structure with a membrane switch according to a first embodiment of the present invention.
Figure 2:
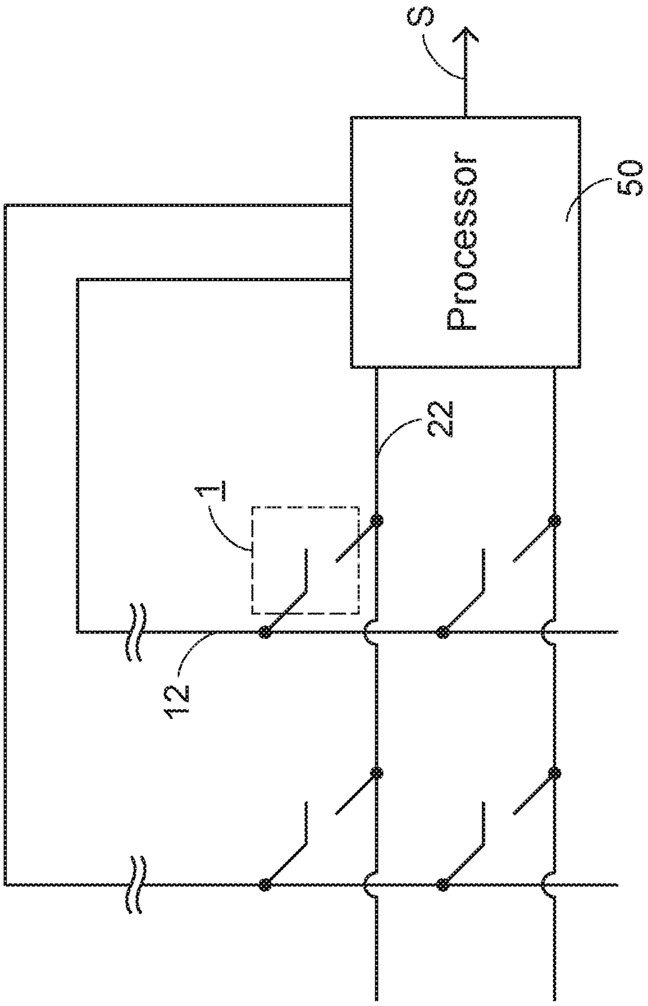
FIG. 2 is a schematic circuitry diagram illustrating the connection between the membrane switch of the first embodiment and a processor of a keyboard device.
Figure 3:
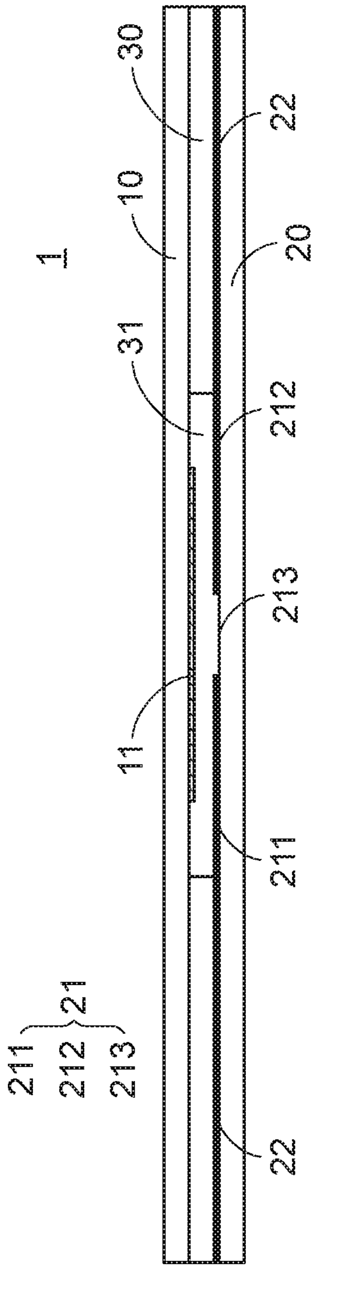
FIG. 3 is a schematic side view illustrating a first circuit layer, a spacer layer and a second circuit layer of the membrane switch according to the first embodiment of the present invention.

FIG. 1 is a schematic exploded view illustrating a key structure with a membrane switch according to a first embodiment of the present invention. FIG. 2 is a schematic circuitry diagram illustrating the connection between the membrane switch of the first embodiment and a processor of a keyboard device. FIG. 3 is a schematic side view illustrating a first circuit layer, a spacer layer and a second circuit layer of the membrane switch according to the first embodiment of the present invention.

In an embodiment, the membrane switch 1 comprises a first circuit layer 10, a second circuit layer 20 and a spacer layer 30. The first circuit layer 10 comprises at least one first conductive pattern 11 and a first conductor line 12. The first conductor line 12 is electrically connected with the at least one first conductive pattern 11. The second circuit layer 20 comprises at least one second conductive pattern 21 and a second conductor line 22. The second conductor line 22 is electrically connected with the at least one second conductive pattern 21. The spacer layer 30 comprises at least one perforation 31. The second circuit layer 20 and the first circuit layer 10 are aligned with each other. The position of each second conductive pattern 21 is aligned with the position of the corresponding first conductive pattern 11. Moreover, the shape of the second conductive pattern 21 is different from the shape of the first conductive pattern 11. The spacer layer 30 is arranged between the first circuit layer 10 and the second circuit layer 20. Each perforation 31 of the spacer layer 30 is aligned with the corresponding first conductive pattern 11 and the corresponding second conductive pattern 21. Consequently, the first conductive pattern 11 is allowed to be penetrated through the perforation 31 and contacted with the corresponding second conductive pattern 21.

In an embodiment, the second conductive pattern 21 comprises a first conduction region 211, a separation region 213 and a second conduction region 212. The first conduction region 211 and the second conduction region 212 are aligned with each other. The separation region 213 is arranged between the first conduction region 211 and the second conduction region 212. In addition, the first conduction region 211 and the second conduction region 212 are separated from each other by the separation region 213. Both of the first conduction region 211, the separation region 213 and the second conduction region 212 are aligned with the first conductive pattern 11.

After the first conductive pattern 11 is penetrated through the corresponding perforation 31, the corresponding second conductive pattern 21 is contacted with and covered by of the first conductive pattern 11. Consequently, a conductive contact surface 40 (see FIGS. 4A and 4B) is formed between the first conductive pattern 11 and the second conductive pattern 22. In other words, the first conduction region 211, the separation region 213 and the second conduction region 212 of the second conductive pattern 21 are electrically contacted with and covered by the first conductive pattern 11, and the conductive contact surface 40 is defined by the contacted surface of the first conductive pattern 11 and the contacted surface of the second conductive pattern 22. Since the first conduction region 211 and the second conduction region 212 are electrically connected with each other through the conductive contact surface 40, the membrane switch 1 is turned on. In accordance with a feature of the present invention, the area of the conductive contact surface 40 is related to a resistance value. The larger area of the conductive contact surface 40 represents a smaller resistance value. After the conductive contact surface 40 is formed, a current will flow in the direction from the first conductive pattern 11 to the second conductive pattern 21 through the conductive contact surface 40. According to the resistance value, a key signal S is generated.

The membrane switch 1 is electrically connected with a processor 50 of the keyboard device. Moreover, the processor 50 is electrically connected with the first conductor line 12 of the first circuit layer 10 and the second conductor line 22 of the second circuit layer 20. The processor 50 is used for detecting the resistance value of the membrane switch 1 and generating the key signal S according to the resistance value of the membrane switch 1.

Please refer to FIG. 1 again. The present invention further provides a key structure 2 of a keyboard device. The key structure 2 comprises a base plate 60, the membrane switch 1, an elastic triggering element 70, a keycap 80 and a supporting element 90. As shown in FIG. 2, the keyboard device further comprises the processor 50, and the membrane switch 1 is electrically connected with the processor 50. The membrane switch 1 has the abovementioned structure. That is, the membrane switch 1 comprises the first circuit layer 10, the second circuit layer 20 and the spacer layer 30. The first circuit layer 10 comprises at least one first conductive pattern 11. The second circuit layer 20 comprises at least one second conductive pattern 21. The spacer layer 30 comprises at least one perforation 31. The spacer layer 30 is arranged between the first circuit layer 10 and the second circuit layer 20.

The keycap 80 is located over the first circuit layer 10. In addition, the first conductive pattern 11 and the second conductive pattern 21 are covered by the keycap 80. The base plate 60 is located under the second circuit layer 20. The supporting element 90 is arranged between the keycap 80 and the base plate 60. The keycap 80 and the base plate 60 are connected with each other through the supporting element 90. The elastic triggering element 70 is arranged between the keycap 80 and the first conductive pattern 11. In addition, the elastic triggering element 70 is aligned with the first conductive pattern 11. The processor 50 is electrically connected with the first circuit layer 10 and the second circuit layer 20. The stack structure of the membrane switch 1 and the operations of the membrane switch 1 have been mentioned above, and not redundantly described herein.

Figure 4A:
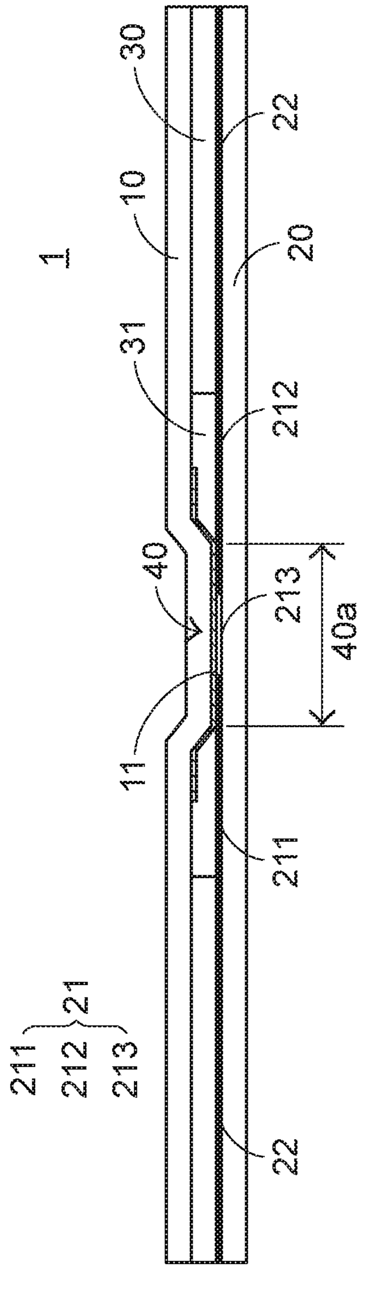
FIG. 4A is a schematic side view illustrating the circuit layers of the membrane switch according to the first embodiment of the present invention, in which the membrane switch is triggered in response to the pressing force with a smaller force magnitude.
Figure 4B:
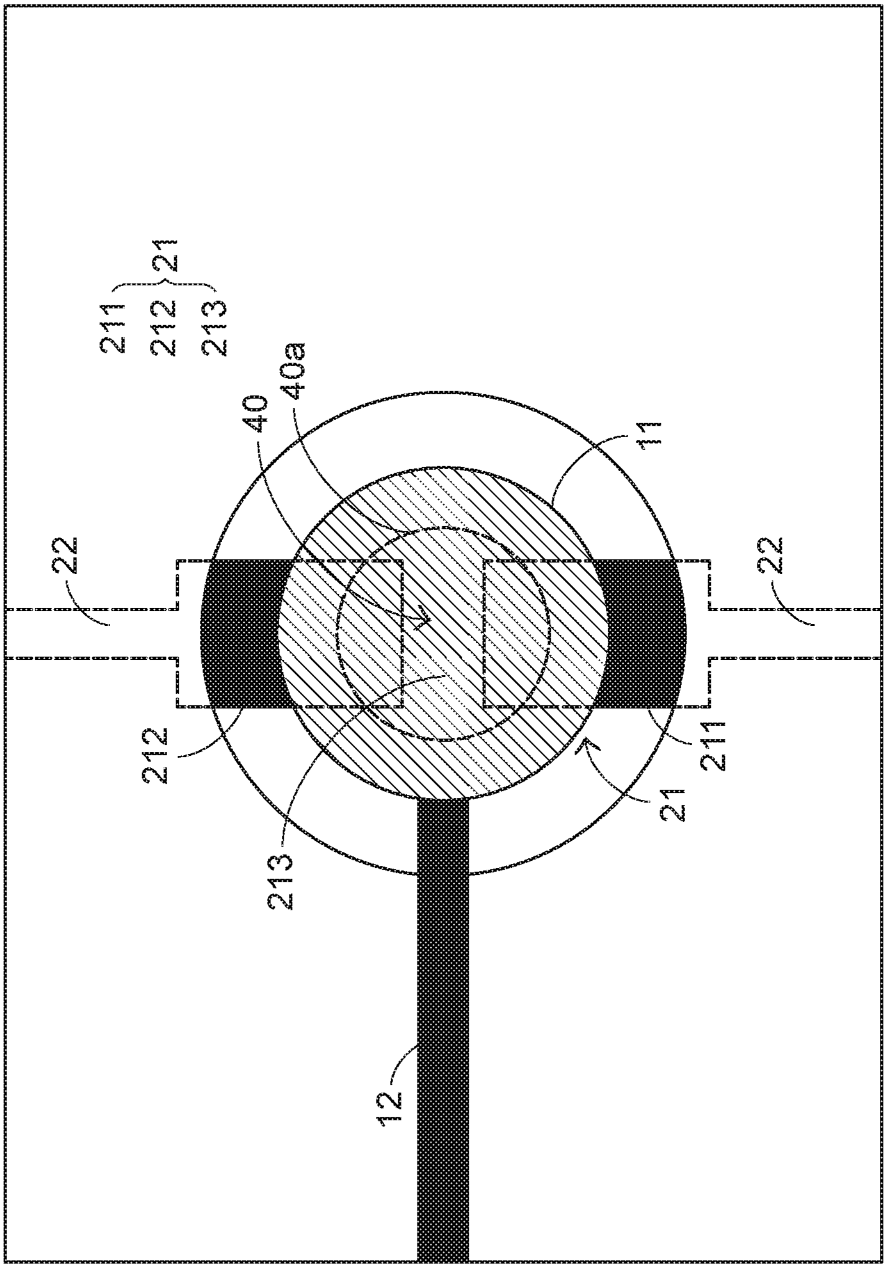
FIG. 4B is a schematic top view illustrating the circuit layers of the membrane switch as shown in FIG. 4A.
Figure 5A:
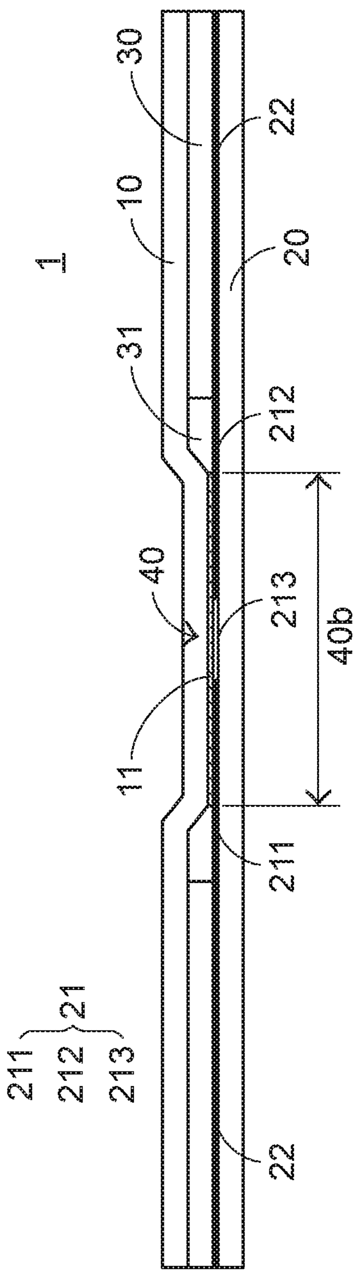
FIG. 5A is a schematic side view illustrating the circuit layers of the membrane switch according to the first embodiment of the present invention, in which the membrane switch is triggered in response to the pressing force with a larger force magnitude.
Figure 5B:
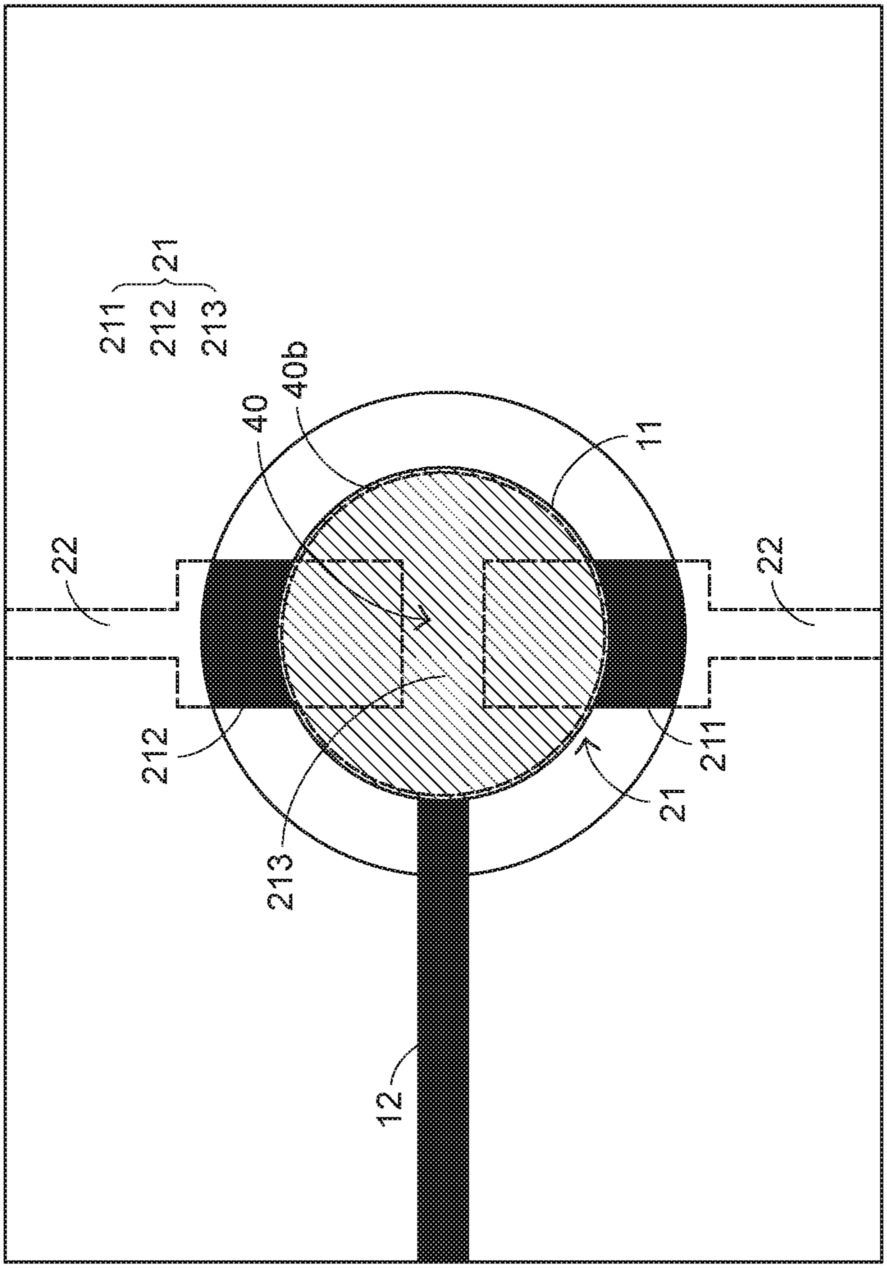
FIG. 5B is a schematic top view illustrating the circuit layers of the membrane switch as shown in FIG. 5A.

The formation of the conductive contact surface 40 when the membrane switch 1 is triggered will be described as follows. FIG. 4A is a schematic side view illustrating the circuit layers of the membrane switch according to the first embodiment of the present invention, in which the membrane switch is triggered in response to the pressing force with a smaller force magnitude. FIG. 4B is a schematic top view illustrating the circuit layers of the membrane switch as shown in FIG. 4A. FIG. 5A is a schematic side view illustrating the circuit layers of the membrane switch according to the first embodiment of the present invention, in which the membrane switch is triggered in response to the pressing force with a larger force magnitude. FIG. 5B is a schematic top view illustrating the circuit layers of the membrane switch as shown in FIG. 5A. The operations of the membrane switch 1 will be described in more details as follows.

When the keycap 80 is pressed down, the first conductive pattern 11 is correspondingly moved downwardly. After the first conductive pattern 11 is penetrated through the corresponding perforation 31 and the corresponding second conductive pattern 21 is contacted with and covered by of the first conductive pattern 11, the conductive contact surface 40 is formed between the first conductive pattern 11 and the second conductive pattern 22. Consequently, the membrane switch 1 is triggered. As mentioned above, the area of the conductive contact surface 40 is related to the resistance value. The larger area of the conductive contact surface 40 represents a smaller resistance value. While a pressing force is applied to the keycap 40, the keycap 40 is moved downwardly to a travel distance, the elastic triggering element 70 is subjected to deformation, and the membrane switch 1 is triggered. In case that the magnitude of the pressing force or the travel distance is changed, the area of the conductive contact surface 40 is correspondingly changed. For example, as the pressing force or the travel distance is increased, the area of the conductive contact surface 40 is increased, and the resistance value is decreased. In contrast, as the pressing force or the travel distance is decreased, the area of the conductive contact surface 40 is decreased, and the resistance value is increased. In case that the keycap 80 is not pressed down and the membrane switch 1 is not triggered, the conductive contact surface 40 is not formed. Under this circumstance, the resistance value is very large, and thus no current flows through the conductive contact surface 40.

In the situation of FIGS. 4A and 4B, the magnitude of the pressing force and the travel distance are small, and the membrane switch 1 is indeed triggered. As shown in FIGS. 4A and 4B, the first conduction region 211, the separation region 213 and the second conduction region 212 of the second conductive pattern 21 are electrically contacted with and covered by the first conductive pattern 11 of the first circuit layer 10, and the conductive contact surface 40 is formed. Under this circumstance, the area of the conductive contact surface 40 is equal to a first area 40*a*.

In the situation of FIGS. 5A and 5B, the magnitude of the pressing force and the travel distance are large, and the membrane switch 1 is indeed triggered. As shown in FIGS. 4A and 4B, the first conduction region 211, the separation region 213 and the second conduction region 212 of the second conductive pattern 21 are electrically contacted with and covered by the first conductive pattern 11 of the first circuit layer 10, and the conductive contact surface 40 is formed. Under this circumstance, the area of the conductive contact surface 40 is equal to a second area 40*b*.

Please refer to FIGS. 4A, 4B, 5A and 5B again. When the membrane switch 1 is triggered, the second area 40*b* corresponding to the larger pressing force or the larger travel distance is obviously larger than the first area 40*a* corresponding to the smaller pressing force or the smaller travel distance. The resistance value of the conductive contact surface 40 corresponding to the first area 40*a* is equal to a first resistance value. The resistance value of the conductive contact surface 40 corresponding to the second area 40*b* is equal to a second resistance value. Since the second area 40*b* is larger than the first area 40*a*, the second resistance value is smaller than the first resistance value. Since the current flows through the larger contact area more easily, the resistance value corresponding to the larger contact area is smaller.

In case that the processor 50 as shown in FIG. 2 senses that the resistance value from the membrane switch 1 is smaller than or equal to the first resistance value, the processor 50 judges that the keycap corresponding to the membrane switch 1 is pressed down and the membrane switch 1 is triggered. Consequently, the processor 50 generates a key signal S. That is, if the area of the conductive contact surface 40 corresponding to the pressing force or the travel distance is larger than the first area 40*a*, the processor 50 judges that the membrane switch 1 is normally triggered.

On the other hand, if the resistance value is in the range between the second resistance value and the first resistance value, the processor 50 also generates the key signal S. As mentioned above, the area of the conductive contact surface 40 is related to the magnitude of the pressing force. Consequently, if the area of the conductive contact surface 40 is smaller than the second area 40*b* but larger than the first area 40*a*, the resistance value is larger than the second resistance value but smaller than the first resistance value. In case that the area of the conductive contact surface 40 is equal to the second area 40*b* (i.e., the maximum contact area), the resistance value is equal to the second resistance value (i.e., the minimum resistance value). As long as the resistance value lies in the range between the second resistance value and the first resistance value, or if the resistance value is larger than or equal to the second resistance value and the resistance value is smaller than the first resistance value, the processor 50 judges that the keycap corresponding to the membrane switch 1 is pressed down and the membrane switch 1 is triggered. Consequently, as shown in FIG. 2, the processor generates the key signal S.

For example, if the area of the conductive contact surface 40 is equal to the first area 40*a*, the resistance value is 5 k ohms; and if the area of the conductive contact surface 40 is equal to the second area 40*b*, the resistance value is 2.5 k ohms. Since the second area 40*b* is larger than the first area 40*a*, the resistance value (i.e., 2.5 k ohms) corresponding to the second area 40*b* is smaller than the resistance value (i.e., 5 k ohms) corresponding to the first area 40*a*.

In case that the membrane switch 1 is possibly suffered from the ghost key phenomenon, the processor 50 detects that a small amount of current flows through the first conductor line 12 of the first circuit layer 10 and the second conductor line 22 of the second circuit layer 20. Since the second conductive pattern 21 is not electrically contacted with and covered by the first conductive pattern 11, the conductive contact surface 40 is not formed. Under this circumstance, the resistance value is very large. That is, the resistance value is larger than the first resistance value. Since the resistance value is larger than the first resistance value or much larger than the general resistance value, the processor 50 judges that the membrane switch 1 is not turned on. Under this circumstance, the key signal S is not generated. Consequently, the ghost key phenomenon can be avoided.

Figure 6:
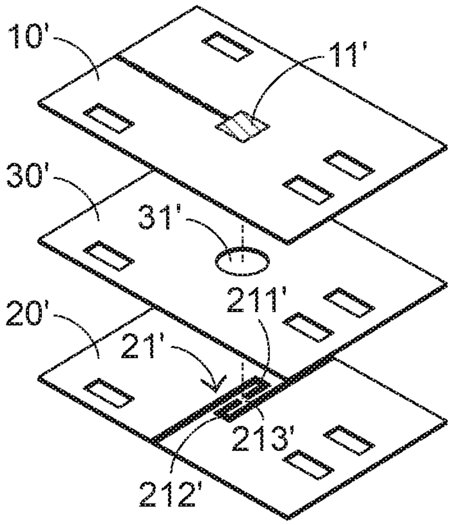
FIG. 6 is a schematic exploded view illustrating the circuit layers of a membrane switch according to a second embodiment of the present invention.

FIG. 6 is a schematic exploded view illustrating the circuit layers of a membrane switch according to a second embodiment of the present invention. For brevity, the structures of the components similar to those of the first embodiment will not be redundantly described herein. In this embodiment, the membrane switch comprises a first circuit layer 10', a second circuit layer 20' and a spacer layer 30'. The first circuit layer 10' comprises at least one first conductive pattern 11'. The second circuit layer 20' comprises at least one second conductive pattern 21'. The spacer layer 30' comprises at least one perforation 31'. The second conductive pattern 21' comprises a first conduction region 211', a separation region 213' and a second conduction region 212'. The first conduction region 211' and the second conduction region 212' are aligned with each other. The separation region 213' is arranged between the first conduction region 211' and the second conduction region 212'. In addition, the first conduction region 211' and the second conduction region 212' are separated from each other by the separation region 213'. Each perforation 31' is aligned with the corresponding first conductive pattern 11' and the corresponding second conductive pattern 21'. Consequently, after the first conductive pattern 11' is penetrated through the perforation 31', the first conductive pattern 11' can be contacted with the corresponding second conductive pattern 21'.

In this embodiment, the shape of the first conductive pattern 11' and the shape of the second conductive pattern 21' are different. For example, the first conductive pattern 11' has a square shape, and the second conductive pattern 21' has a polygonal shape or an irregular shape.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A membrane switch, comprising:

a first circuit layer comprising a first conductive pattern;

a second circuit layer comprising a second conductive pattern, wherein the second circuit layer is aligned with the first circuit layer, the second conductive pattern is aligned with the first conductive pattern, and the second conductive pattern and the first conductive pattern have different shapes; and a spacer layer arranged between the first circuit layer and the second circuit layer, and comprising a perforation, wherein the perforation is aligned with the first conductive pattern and the second conductive pattern, wherein after the first conductive pattern is penetrated through the perforation and the first conductive pattern is contacted with the second conductive pattern, a conductive contact surface is formed between the first conductive pattern and the second conductive pattern, and the conductive contact surface has a resistance value corresponding to an area of the conductive contact surface, wherein when a current flows from the first conductive pattern to the second conductive pattern through the conductive contact surface, a key signal is generated according to the resistance value, wherein the area of the conductive contact surface and the resistance value of the conductive contact surface are negatively correlated with each other.

2. The membrane switch according to claim 1, wherein the first circuit layer further comprises a first conductor line, and the second circuit layer comprises a second conductor line, wherein the first conductor line is electrically connected with the first conductive pattern, and the second conductor line is electrically connected with the second conductive pattern.

3. The membrane switch according to claim 1, wherein the membrane switch is electrically connected with a processor, and the processor judges whether the key signal is generated according to the resistance value.

4. The membrane switch according to claim 1, wherein when the second conductive pattern is contacted with and covered by the first conductive pattern, the conductive contact surface is formed.

5. The membrane switch according to claim 1, wherein the second conductive pattern comprises a first conduction region, a separation region and a second conduction region, wherein the first conduction region and the second conduction region are aligned with each other, the separation region is arranged between the first conduction region and the second conduction region, and the first conduction region and the second conduction region are separated from each other by the separation region.

6. The membrane switch according to claim 5, wherein the first conduction region, the second conduction region and the separation region are aligned with the first conductive pattern.

7. The membrane switch according to claim 5, wherein when the first conductive pattern is contacted with the second conductive pattern, the first conduction region, the separation region and the second conduction region of the second conductive pattern are electrically contacted with and covered by the first conductive pattern, and the conductive contact surface is formed, so that the first conduction region and the second conduction region are electrically connected with each other through the conductive contact surface.

8. The membrane switch according to claim 1, wherein when the area of the conductive contact surface is equal to a first area, the resistance value is equal to a first resistance value, wherein when the area of the conductive contact surface is equal to a second area, the resistance value is equal to a second resistance value.

9. The membrane switch according to claim 8, wherein the second area is larger than the first area, and the second resistance value is larger than the first resistance value.

10. The membrane switch according to claim 9, wherein when the resistance value is smaller than or equal to the first resistance value, the key signal is generated.

11. The membrane switch according to claim 9, wherein if when the resistance value is larger than or equal to the second resistance value and the resistance value is smaller than the first resistance value, the key signal is generated.

12. The membrane switch according to claim 9, wherein when the area of the conductive contact surface is equal to the first area, the resistance value is 5 k ohms, wherein when the area of the conductive contact surface is equal to the second area, the resistance value is 2.5 k ohms.

13. A key structure with a membrane switch, the key structure comprising:

a base plate;

the membrane switch installed on the base plate, and comprising a first circuit layer, a second circuit layer and a spacer layer, wherein the first circuit layer comprises a first conductive pattern, the second circuit layer comprises a second conductive pattern, and the spacer layer comprises a perforation, wherein the second circuit layer is aligned with the first circuit layer, the spacer layer is arranged between the first circuit layer and the second circuit layer, the second conductive pattern is aligned with the first conductive pattern, the second conductive pattern and the first conductive pattern have different shapes, and the perforation is aligned with the first conductive pattern and the second conductive pattern, wherein after the first conductive pattern is penetrated through the perforation and the first conductive pattern is contacted with the second conductive pattern, a conductive contact surface is formed between the first conductive pattern and the second conductive pattern, and the conductive contact surface has a resistance value corresponding to an area of the conductive contact surface, wherein when a current flows from the first conductive pattern to the second conductive pattern through the conductive contact surface, a key signal is generated according to the resistance value, wherein the area of the conductive contact surface and the resistance value of the conductive contact surface are negatively correlated with each other;

an elastic triggering element located over the membrane switch, and aligned with the first conductive pattern and the second conductive pattern;

a keycap located over the elastic triggering element, wherein the first conductive pattern and the second conductive pattern are covered by the keycap; and a supporting element connected with the keycap and the base plate.

* * * * *